(12) United States Patent
Lim

(10) Patent No.: US 8,995,930 B2
(45) Date of Patent: Mar. 31, 2015

(54) METHOD FOR CREATING A CHANNEL BETWEEN FEMTO BASE STATIONS BASED ON USER EQUIPMENT

(75) Inventor: Jaewon Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/583,621

(22) PCT Filed: Feb. 25, 2011

(86) PCT No.: PCT/KR2011/001345
§ 371 (c)(1),
(2), (4) Date: Sep. 7, 2012

(87) PCT Pub. No.: WO2011/111936
PCT Pub. Date: Sep. 15, 2011

(65) Prior Publication Data
US 2012/0329448 A1    Dec. 27, 2012

(30) Foreign Application Priority Data

Mar. 9, 2010 (KR) ........................ 10-2010-0020981

(51) Int. Cl.
| | | |
|---|---|---|
| H04B 1/00 | (2006.01) |
| H04B 7/00 | (2006.01) |
| H04W 4/00 | (2009.01) |
| H04W 36/00 | (2009.01) |
| H04M 1/00 | (2006.01) |
| H04W 92/20 | (2009.01) |
| H04W 84/04 | (2009.01) |

(52) U.S. Cl.
CPC ............ *H04W 92/20* (2013.01); *H04W 84/045* (2013.01)

USPC .......... 455/69; 455/422.1; 455/440; 455/555; 370/315; 370/329; 370/331; 709/228; 709/232

(58) Field of Classification Search
CPC ..... H04W 52/24; H04W 52/12; H04W 52/20; H04W 88/02; H04W 4/02; H04W 88/06; H04L 1/0003; H04L 1/0026
USPC ......... 455/69, 422.1, 440, 514, 555; 370/315, 370/329, 331; 709/228, 232
See application file for complete search history.

(56) References Cited

U.S. PATENT DOCUMENTS

| | | | | |
|---|---|---|---|---|
| 3,663,762 | A  * | 5/1972 | Joel, Jr. ......................... | 455/440 |
| 5,257,405 | A  * | 10/1993 | Reitberger .................... | 455/514 |
| 5,265,150 | A  * | 11/1993 | Helmkamp et al. .......... | 455/555 |
| 8,190,750 | B2 * | 5/2012 | Balachandran et al. ...... | 709/228 |
| 8,274,923 | B2 * | 9/2012 | Shen et al. .................... | 370/315 |
| 8,626,943 | B2 * | 1/2014 | Balachandran et al. ...... | 709/232 |
| 2003/0119452 | A1* | 6/2003 | Kim et al. ....................... | 455/69 |
| 2008/0261602 | A1 | 10/2008 | Livneh | |
| 2009/0083431 | A1* | 3/2009 | Balachandran et al. ...... | 709/228 |
| 2011/0225317 | A1* | 9/2011 | Balachandran et al. ...... | 709/232 |
| 2012/0329448 | A1* | 12/2012 | Lim .......................... | 455/422.1 |
| 2013/0100925 | A1* | 4/2013 | Ahn et al. ..................... | 370/329 |
| 2013/0195078 | A1* | 8/2013 | Kobayashi et al. ........... | 370/331 |

FOREIGN PATENT DOCUMENTS

| | | |
|---|---|---|
| KR | 10-2009-0023830 | 3/2009 |
| KR | 10-2009-0112337 | 10/2009 |

* cited by examiner

*Primary Examiner* — William D Cumming
(74) *Attorney, Agent, or Firm* — Lee, Hong, Degerman, Kang & Waimey

(57) ABSTRACT

A method for generating a direct or indirect wireless channel between femto base stations. To relieve interference that occurs in user equipment depending on the proximity of the femto base station, a user equipment may derive to generate an inter-femto channel between the femto base stations.

6 Claims, 14 Drawing Sheets

FIG. 7
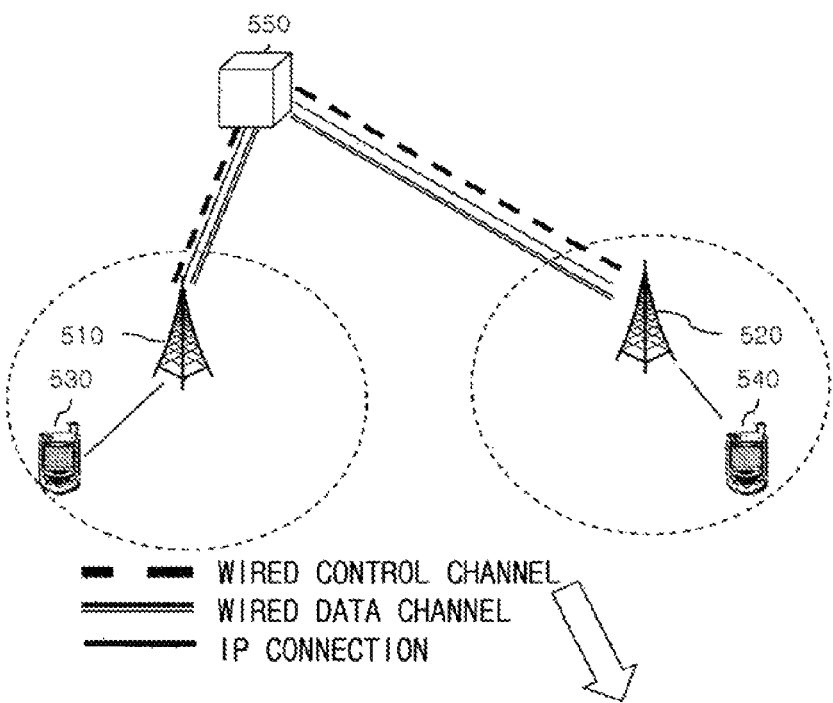
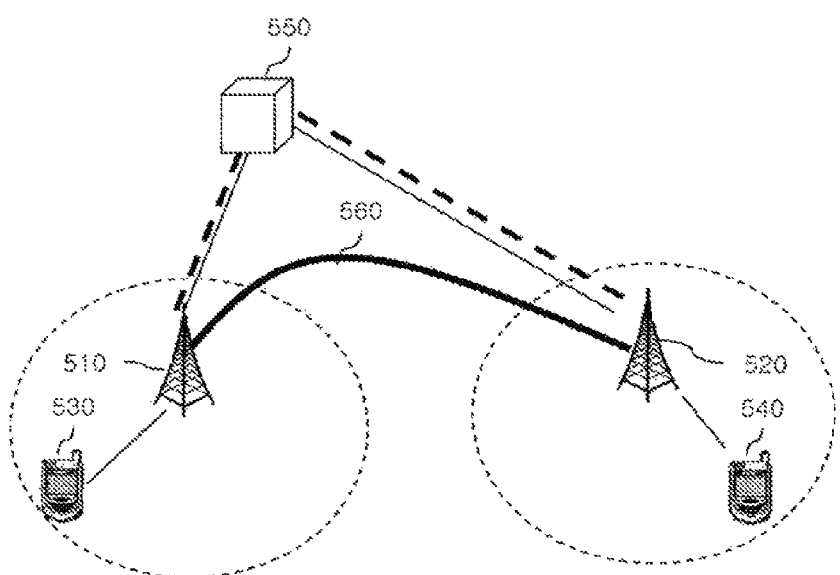

METHOD FOR CREATING A CHANNEL BETWEEN FEMTO BASE STATIONS BASED ON USER EQUIPMENT

CROSS-REFERENCE TO RELATED APPLICATIONS

This application is the National Stage filing under 35 U.S.C. 371 of International Application No. PCT/KR2011/001345, filed on Feb. 25, 2011, which claims the benefit of earlier filing date and right of priority to Korean Patent Application No. 10-2010-0020981, filed on Mar. 9, 2010, the contents of which are all hereby incorporated by reference herein in their entirety.

TECHNICAL FIELD

The present invention relates to relieving interference that occurs due to adjacency between a femto base station and its base station and to generating an adaptive control channel and a data channel between femto base stations.

BACKGROUND ART

A femto base station refers to a small mobile communication base station that access a mobile communication core network through a broadband network installed in a building, such as a home or office. Inside a building, the coverage of a macro base station may be limited by the outer wall of the building. In such an environment, a femto base station may be installed in the building to expand coverage and enhance call quality. Further, the femto base station may efficiently provide a high-band wired/wireless convergence service. The femto base station is connected to a femto network controller (FNC) through a broadband network, and the femto network controller (FNC) is connected to the mobile communication core network.

Femto base stations may be classified into i) CSG (Closed Subscriber Group) femto base stations and ii) open access femto base stations according to the policy of permitting access to the femto base station. The CSG femto base stations permit only approved users' user equipments to gain access. On the contrary, open access femto base stations provide services to any user equipments that approach a place within a transmission radius without any limitation.

Currently, 3GPP defines CSG IDs necessary for identifying whether a femto base station is a CSG femto base station and a femto base station white list that is a CSG ID list of femto base stations to which a user equipment supporting communication with a femto base station may gain access and which is stored in the USIM (Universal Subscriber Identity Module) of the user equipment. The corresponding femto base station periodically transmits a CSG ID to the user equipment through a control channel (CCH) to verify that the femto base station is a CSG femto base station.

Further, the femto base station is wiredly connected to a femto gateway through the broadband network, and the femto gateway is connected to an MME (Mobility Management Entity) of the mobile communication core network. 3GPP defines, in the network structure of a femto base station, i) a scheme in which a femto gateway controls the femto base station and ii) a scheme in which an MME of the core network controls the femto base station. In the specification, these are collectively described as a femto network controller (FNC).

In the existing femto base station structure, the femto base station is wiredly connected with a femto network controller (FNC) and generates a control channel for transmitting control information between the femto base station and the femto network controller (FNC) and a data channel for transmitting user data between the femto base station and the femto network controller (FNC). The femto network controller (FNC) performs control that allows femto base station registered through the control channel to be smoothly operated. Such control may include managing femto base station paging messages, solving interference between femto base stations, allocating operating frequency resources of the femto base station, and managing mobility of user equipments connected to the femto base station. The femto base station(s) may transmit and receive user data of users that gain access through the data channel connected to the femto network controller (FNC).

Data transmitted from a user equipment to a specific femto base station through an uplink may go through a base station and may be then transmitted over a downlink to another user equipment connected to another femto base station through a femto network controller (FNC).

That is, a femto base station performs communication through a control channel and a data channel established between a femto network controller (FNC) and the femto base station. Communication resources need to be efficiently managed and distributed so that multiple femto base stations maintain smooth communication with multiple user equipments.

In an existing mobile communication scheme, a macro base station MBS) assigns an available frequency resource block to a user equipment connected to the base station for communication with the user equipment. When installed, a macro base station is connected to a core network through a wired backbone network so that the base station may be installed as planned according to cell planning and the quality of service (QoS) may be guaranteed.

Accordingly, in the case that channel coding management and transmission power management are conducted to fit a channel condition for a radio channel between an access user equipment and the base station, the service quality (QoS) for communication with the user equipment may be ensured.

However, since a femto base station (as used herein, the "femto base station" includes a "mobile femto base station", a "multiple access-type femto base station", or a "mesh femto base station") supports a small number of user equipments, e.g., five or less user equipments, and provides a small transmission radius, the femto base station needs to actively generate a control channel and a data channel according to the position of an access user equipment and the channel situation and efficiently process communication data of the access user equipment.

FIG. 1 illustrates an example where multiple CSG femto base stations are connected to each other through a femto network controller (FNC) in a single macro base station.

Referring to FIG. 1, the CSG femto base station different from each other are positioned adjacent to each other in the transmission radius of the macro base station. The first femto base station 110, the second femto base station 120, and the third femto base station 130 correspond to CSG1, the fourth femto base station 140 and the fifth femto base station 150 correspond to CSG2, and the sixth femto base station 160 and the seventh femto base station 170 correspond to CSG3. The femto base stations are all connected to the femto network controller 180. A user equipment 190 is positioned in an area where the first femto base station 110, the third femto base station 130, and the fourth femto base station 140 overlap in terms of transmission radius.

Here, the user equipment 190 is assumed to be a dual mode user equipment that may gain access to multiple base stations at the same time. The dual mode user equipment may be a user equipment that may simultaneously use various radio access schemes, a user equipment that supports the CoMP (Cooperative Multipoint Transmission) technology currently defined in 3GPP LTE, IEEE 802.16m, which enables a single user equipment to perform simultaneous communication with multiple base stations, or a user equipment that supports multiple antenna technologies or smart antenna technologies.

When according the white list of the user equipment 190, the user equipment 190 can access both CSG1 and CSG2, the user equipment 190 may connect to all of the first femto base station 110, the third femto base station 130, and the fourth femto base station 140 at the present position (which is marked in solid lines) to thereby conduct communication.

However, since the femto base stations to which the user equipment 190 is connected are close to each other and thus transmission radii thereof overlap, interference may occur.

Accordingly, in such case, it is needed to adjust and manage interference and traffic between the user equipment and the femto base station with which the user equipment is communicating. That is, the cooperation between the adjacent femto base stations to which the user equipment is simultaneously connected is required so as to remove interference and process user equipment traffic.

However, the existing scheme, which performs such cooperation through the femto network controller (FNC) and uses a wired broadband network that may not guarantee QoS, has difficulty in adaptively performing cooperation between femto base stations. Moreover, when multiple user equipments connected to an adjacent femto base station attempt to communicate with each other, a method for quick data transmission without passing through a wired network is needed.

That is, unlike the open access femto base station, the CSG femto base station permits only limited types of user equipments to gain access, and thus, the cooperation between femto base stations with different CSGs is limited. In FIG. 1, the femto base stations corresponding to CSG1, the femto base stations corresponding to CSG2, and the femto base stations corresponding to CSG3 have difficulty in mutual cooperation due to differences in CSG values. Inter-CSG femto base station cooperation may be restrictively achieved between femto base stations having the same CSG, which permit access in the same user group.

Accordingly, there is a need for a method of being able to perform communication between femto base stations without any CSG limitation to the femto base stations for smooth cooperation between the femto base stations.

DISCLOSURE

Technical Problem

The present invention has been designed to solve the above problems, and an object of the present invention is to provide a method and apparatus that may generate direct/indirect radio control channels between femto base stations with different CSGs, as well as open access femto base stations and femto base station with the same CSG and may thus reduce interference that may occur in a user equipment connected to a femto base station by another adjacent femto base station.

Another object of the present invention is to provide a method and apparatus that may generate direct/indirect radio control channels between femto base stations with different CSGs, as well as open access femto base stations and femto base station with the same CSG and may thus increase communication efficiency.

Technical Solution

To achieve the above objects, the present invention provides a method and apparatus that may generate a direct or indirect radio control or data channel between femto base stations to thereby remove interference that occurs to the user equipment and to increase communication efficiency.

The method includes measuring a measurement report message including information on the femto base station and a femto base station adjacent to a femto base station to which a user equipment is connected, transmitting a femto state report message for generating a wireless control channel or a wireless data channel between the femto base stations based on the measurement report message to a femto network controller, receiving an inter-femto channel generating request message from the femto network controller, determining whether the femto base station generates the wireless control channel or wireless data channel between the femto base stations based on the inter-femto channel generating request message, and generating by the femto base station the wireless control channel or wireless data channel between the femto base stations according to the determination.

The method includes receiving a measurement report message including information on the femto base station and an adjacent second femto base station to which a user equipment is connected, determining whether to generate a wireless control channel or a wireless data channel with the second femto base station, transmitting an inter-femto channel generating request message for generating the wireless control channel or wireless data channel with the second femto base station, receiving an inter-femto channel generating confirmation message, transmitting an inter-femto base station direct communication shifting alert message to a femto network controller and generating the wireless control channel or wireless data channel with the second femto base station.

The method includes transmitting control data to a femto network controller, receiving a direct IP transmission request message together with a second femto base station from the femto network controller, determining whether to perform direct communication together with the second femto base station based on the direct IP transmission request message, transmitting a direct IP connection agreement message to the femto network controller according to the determination, receiving an IP transmission confirmation message from the femto network controller, and performing direct communication through an IP connection together with the second femto base station.

The apparatus includes a receiver that receives a signal from a user equipment or another femto base station, a measurer that determines whether CSGs are the same and whether a corresponding femto base station is positioned within a transmission radius of a counterpart femto base station, a controller that performs a direct connection with the other femto base station through a wireless channel, and a transmitter that transmits a signal to a femto network controller.

The apparatus includes a dual mode user equipment that includes an antenna that receives and transmits a signal, a receiver that receives the signal from the antenna, a measurer that measures information on a femto base station in communication and an accessible femto base station, a controller that performs a function to generate an indirect wireless channel between the femto base stations, and a transmitter that transmits the signal.

Advantageous Effects

The present invention has the effect of generating direct/indirect radio control channels between femto base stations with different CSGs, as well as open access femto base stations and femto base station with the same CSG to thereby reduce interference that may occur in a user equipment connected to a femto base station by another adjacent femto base station.

The present invention has the effect of generating direct/indirect radio control channels between femto base stations with different CSGs, as well as open access femto base stations and femto base station with the same CSG to thereby increase communication efficiency.

DESCRIPTION OF DRAWINGS

FIG. 7 illustrates an example where femto base stations respectively connected to two user equipments communicating with each other are not adjacent to each other but are connected to the same femto network controller (FNC) according to an embodiment of the present invention.

BEST MODE

Hereinafter, preferred embodiments of the present invention will be described in detail with reference to the accompanying drawings. It is noted that the same reference denotations are used to denote the same step or element throughout the drawings.

According to the scope of the present invention, the following six representative cases in Table 1 may be considered in terms of the condition and position of a user equipment as when a control channel and a data channel are generated between a femto base station (FBS) and a femto network controller (FNC).

TABLE 1

| Case | content |
|---|---|
| 1 | A user equipment and each femto base station are positioned in a region where transmission radii of the two adjacent femto base stations overlap each other |
| 2 | A user equipment is positioned in a region where transmission radii of two adjacent femto base stations overlap each other |
| 3 | Femto base stations respectively connected to two user equipments in communication are adjacent to each other and thus transmission radii overlap each other |
| 4 | Femto base stations respectively connected to two user equipments in communication are adjacent to each other and are positioned in a transmission radius of another femto base station |
| 5 | Femto base stations respectively connected to two user equipments in communication are not adjacent to each other and are connected to the same femto network controller (FNC) |
| 6 | Femto base stations respectively connected to two user equipments in communication are not adjacent to each other and are respectively connected to different femto network controllers (FNCs) |

Other than the above six cases, however, the present invention may also apply to situations where a control channel and a data channel are generated between the femto base station and the femto network controller using the scope of the present invention. For example, in the first method, the adjacent femto base stations may be two or more, and in the third method, one or more femto base stations may be present between the femto base stations to which the user equipment is connected, and there may be two or more user equipments that are in communication.

Hereinafter, the procedure of implementing the scope of the present invention according to the six cases is described in detail.

Figure 1:
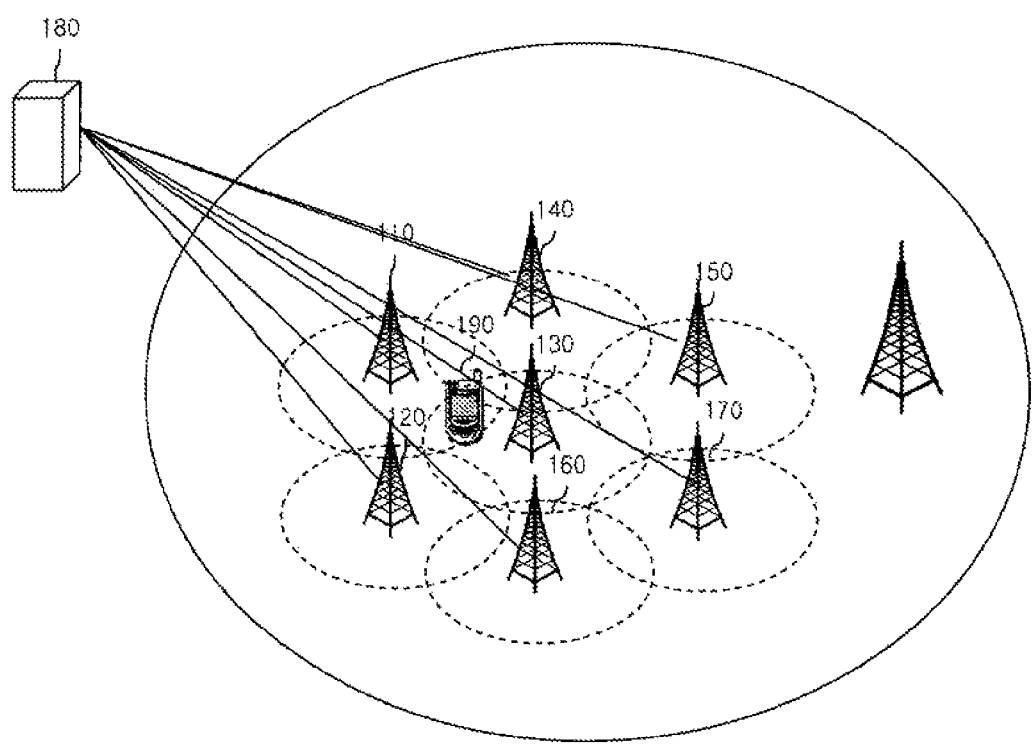
FIG. 1 illustrates an example where multiple CSG femto base stations are connected to each other through a femto network controller (FNC) in a single macro base station.
Figure 2:
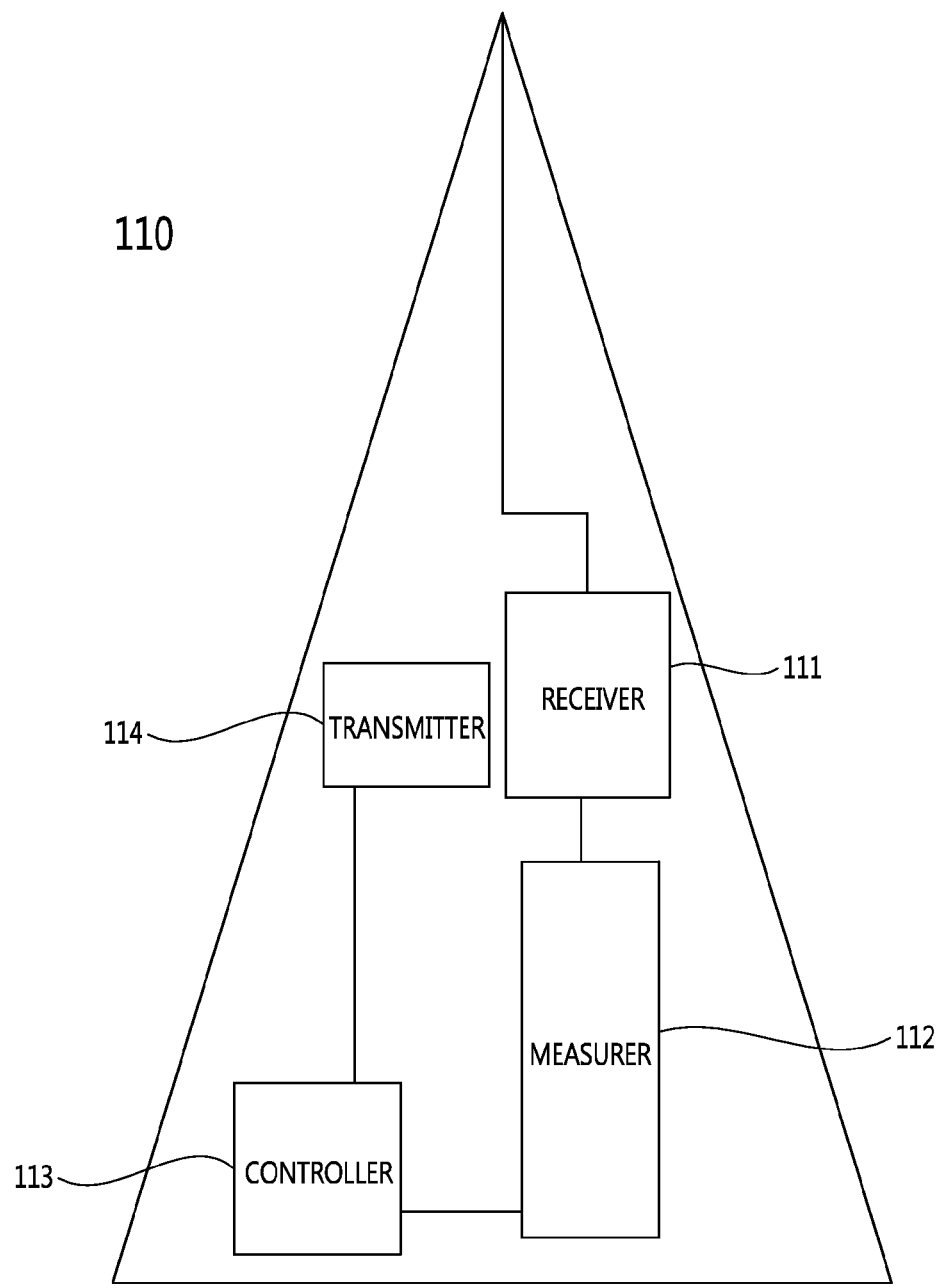
FIG. 2 is a view illustrating a configuration of a dual mode user equipment to implement the present invention.

FIG. 2 is a view illustrating a configuration of a femto base station to implement the present invention.

Referring to FIG. 2, a femto base station 110 includes a receiver 111 to receive a signal from a user equipment or another femto base station, a measurer 112 to determine whether the CSG is the same and to determine whether the femto base station is positioned within a transmission radius of a counterpart femto base station, a controller 113 to perform direct connection to another femto base station through a wireless channel, and a transmitter 114 to transmit a signal to a femto network controller (FNC).

Figure 3:
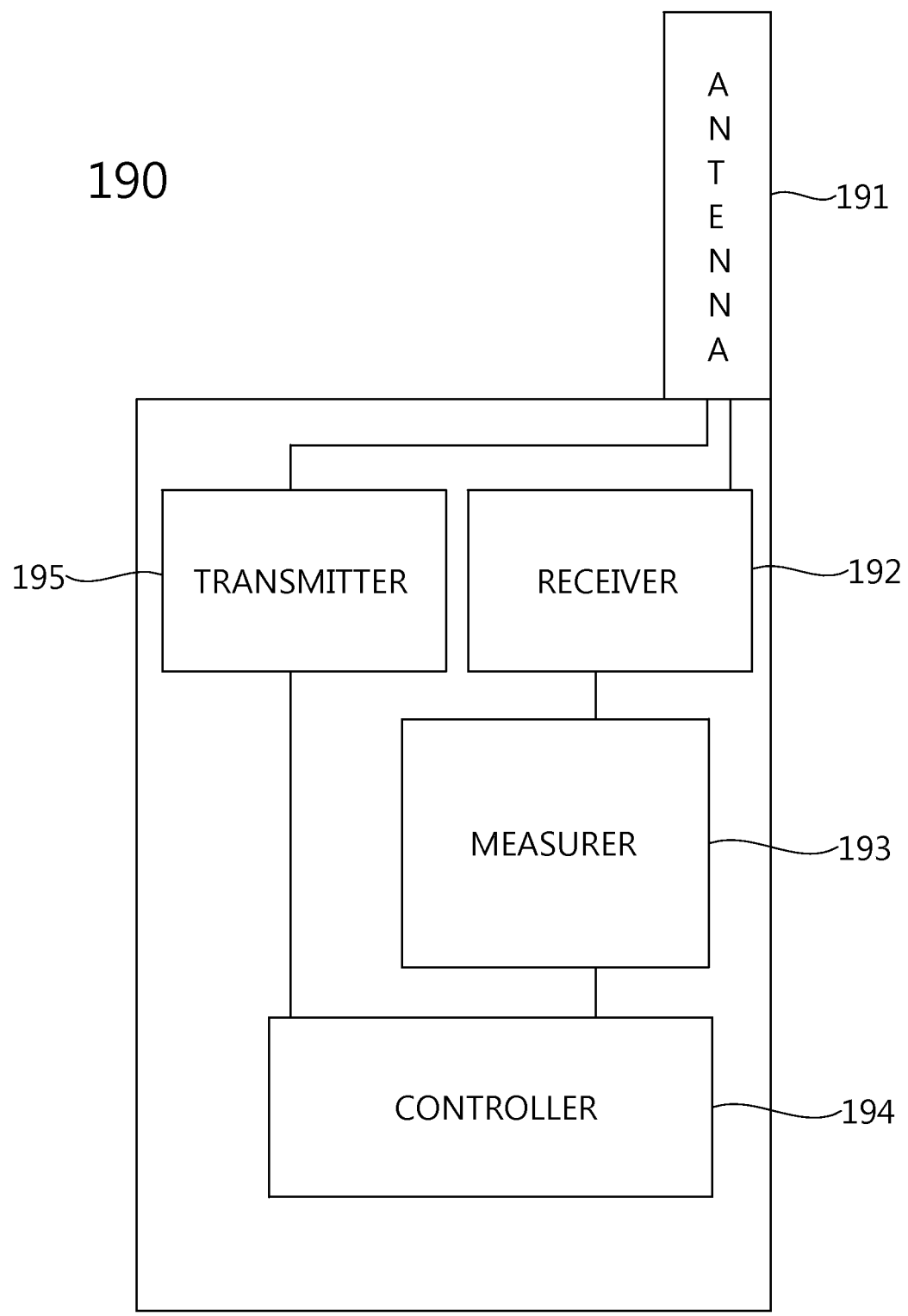
FIG. 3 is a view illustrating a configuration of a dual mode user equipment to implement the present invention.

FIG. 3 is a view illustrating a configuration of a dual mode user equipment to implement the present invention.

Referring to FIG. 3, the dual mode user equipment 190 includes an antenna 191 to receive and transmit a signal, a receiver 192 to receive a signal from the antenna, a measurer 193 to measure information of a femto base station that may gain access to a femto base station that is in communication, a controller 194 to perform a function to generate an indirect wireless channel between femto base stations, and a transmitter 195 to transmit a signal.

Figure 4A:
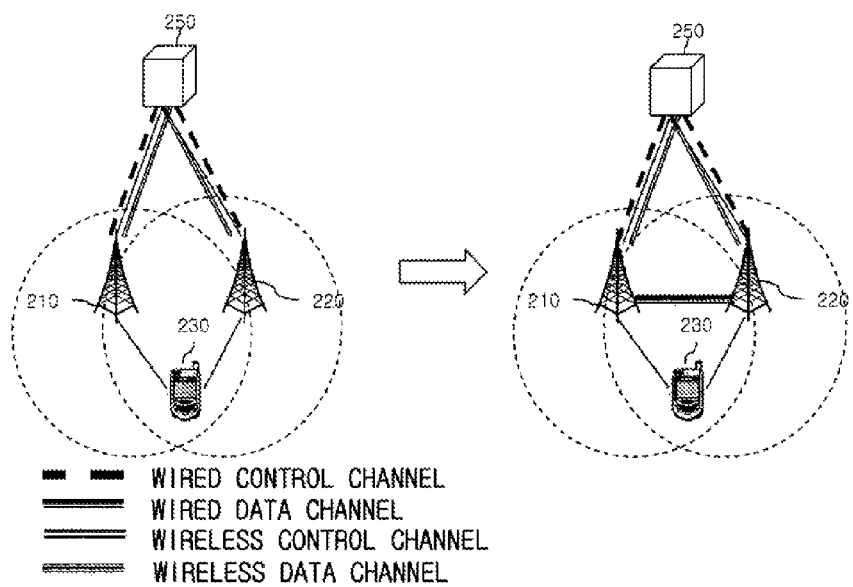
FIG. 4a illustrates an example where a user equipment and two adjacent femto base stations are positioned in a region where transmission radii of the two femto base stations overlap coverage according to an embodiment of the present invention.

FIG. 4a illustrates an example where a user equipment and two adjacent femto base stations are positioned in a region where transmission radii of the two femto base stations overlap coverage according to an embodiment of the present invention.

Referring to FIG. 4a, the user equipment 230, the first femto base station 210, and the second femto base station 220 are positioned in a region (hereinafter, referred to as a "dual region") where the transmission radii of the femto base stations 210 and 220 overlap each other, and the femto base stations have CSGs CSG1 and CSG2 different from each other. Further, the first femto base station 210 and the second femto base station 220 are connected to a femto network controller (FNC) 250 through a wired control channel and a wired data channel.

Since the user equipment 230 is a dual mode user equipment that may be simultaneously connected to a plurality of femto base, the user equipment 230 may perform communication at the same time through the first femto base station 210 and the second femto base station 220 having different CSGs from each other. However, since the user equipment 230 is positioned in the dual region, the first femto base station 210 or the second femto base station 220 may cause interference while the user equipment performs communication with its counterpart femto base station.

Accordingly, quick and adaptive operation between the femto base stations is required so as to remove interference that occurs to the user equipment 230 positioned in the dual region or efficiently distribute and process the traffic of the user equipment 230, or upon soft handover, to transfer information relating thereto. That is, in the case that the user equipment 230 is positioned in the dual region and simultaneously communicates with the first femto base station 210 and the second femto base station 220, it is needed to generate a direct wireless control channel 240 between the femto base stations 210 and 220 so as to enable quick transmission of control data between the first femto base station 210 and the second femto base station 220 and ensure the quality of service (QoS) when transmitting signals sensitive to a latency period, such as voice data of the control channel.

In the case that when the direct wireless control channel 240 is generated, the femto base stations connected to each other via the direct wireless control channel 240 are open access femto base stations or femto base stations having the same CSG, the direct wireless control channel may be generated directly between the femto base stations, and in the case that, as shown in FIG. 2A, the femto base stations have different CSGs, if the femto base stations have different CSGs CSG1 and CSG2, but the user equipment currently connected to both the femto base stations may gain access to both the CSG1 and CSG2 femto base stations, for the direct wireless control channel 240 to be able to be generated between the femto base stations having different CSGs to thereby support the user equipment, the femto base station may receive information on the other adjacent femto base station from the user equipment 230 to allow the femto network controller (FNC) to generate the direct wireless control channel 240 or the femto base station may actively generate the direct wireless control channel 240 together with the adjacent femto base station having a different CSG.

The direct wireless control channel 240 is used for traffic control for the user equipment 230 positioned in the dual region or to manage interference that occurs in the dual region, or upon soft handover, to transfer relating information, operates independently from the control channel generated between the existing femto base station and the femto network controller, and is removed when the user equipment 230 departs from the dual region.

Further, as suggested herein, a method of generating a channel between femto cells may support a user equipment that is positioned in the dual region to be able to gain access to all of the femto base stations configuring the dual region, and in the case that generating of a wireless control channel is needed for inter-femto base station interference control or CoMP (Coordinated Multi-Point Transmission), even when no user equipment is present in the dual region, the method may generate a wireless control channel.

Figure 4B:
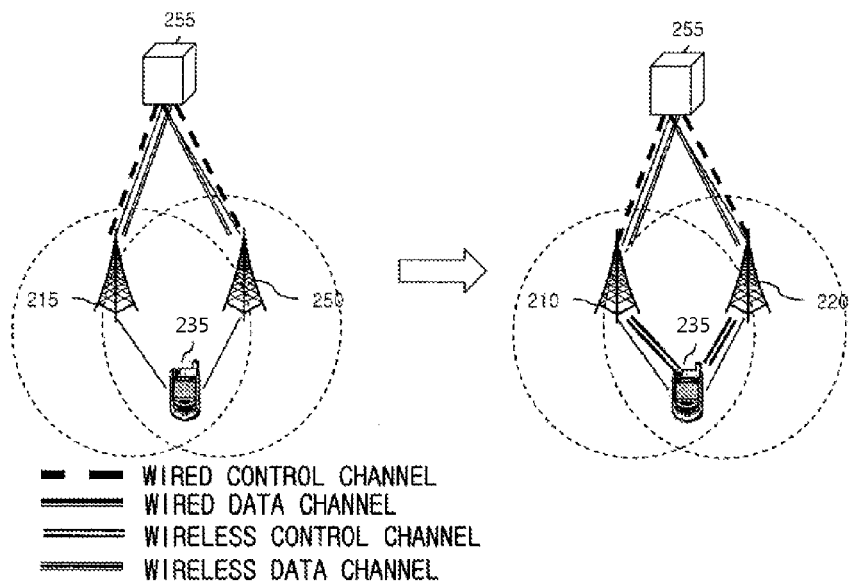
FIG. 4b illustrates an example where a user equipment alone is positioned in a region where transmission radii of two adjacent femto base stations overlap each other according to an embodiment of the present invention.

FIG. 4b illustrates an example where a user equipment alone is positioned in a region where transmission radii of two adjacent femto base stations overlap each other according to an embodiment of the present invention.

Referring to FIG. 4b, unlike in FIG. 4a, only the user equipment 235 is positioned in the dual region between the first femto base station (CSG 1) 215 and the second femto base station (CSG2) 225 which have different CSGs.

Under a situation as illustrated, the user equipment 235, as in the example of FIG. 4a, may simultaneously perform communication through the first femto base station 215 and the second femto base station 225 having different CSGs, but since the femto base stations are adjacent to each other, interference may occur when user equipment 235 performs communication.

However, unlike in FIG. 4a, since the femto base stations 215 and 225 are not close enough for a direct wireless control channel to be generated between the femto base stations, an indirect wireless control channel 245 is generated between the femto base stations 215 and 225 through the user equipment 235 positioned in the dual region. That the distance between the femto base stations is not short enough to generate a direct wireless control channel means that transmission radius of a specific femto base station does not reach the adjacent femto base station. As in the example illustrated in FIG. 4a, in the case that the user equipment has difficulty in performing communication with the two femto base stations due to interference between the femto cells, interference control is performed in advance so that the user equipment may communicate with the adjacent femto base stations through the femto network controller, and a control channel between the femto base stations may be then generated through the user equipment.

Besides, in the case that the indirect wireless control channel is generated through the user equipment 235, the indirect wireless control channel may be generated even without changing the radio frames of the existing femto base stations 215 and 225, and accordingly, even when the distance between the femto base stations is sufficiently short, as is often case, the indirect wireless control channel may be selectively generated through the user equipment 235.

As in FIG. 4a, when generating the indirect wireless control channel, in the case that the femto base stations connected to each other via the indirect wireless control channel have different CSGs, for the indirect wireless control channel to be generated despite the fact that the femto base stations have different CSGs CSG1 and CSG2, the femto base station may receive information on the other femto base station from the user equipment 235 so that the femto network controller (FNC) may generate the indirect wireless control channel through the user equipment 235 or may actively generate the indirect wireless control channel together with the adjacent femto base station having a different CSG by using the information received from the user equipment.

The indirect wireless control channel is used to manage interference that occurs in the dual region or to perform traffic control for the user equipment 235 positioned in the dual region, operates independently from a control channel generated between the existing femto base station and the femto network controller, and is removed when the user equipment 235 departs from the dual region.

Further, in the case that a user equipment other than the user equipments 230 and 235 is positioned in the dual region, traffic optimization may be performed through the generated wireless control channels so that the traffic of the user equipment is optimized.

Figure 5:
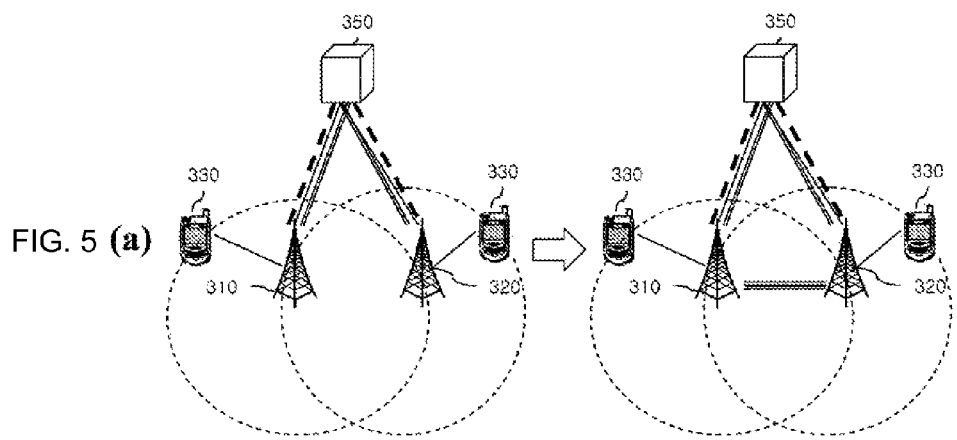
FIG. 5a illustrates an example where transmission radii of femto base stations to which two communicating user equipments are connected overlap each other and the femto base stations are positioned in the overlapping transmission radii according to an embodiment of the present invention.
FIG. 5b illustrates an example where transmission radii of femto base stations respectively connected to two user equipments which are in communication overlap each other and the femto base stations are not positioned in the overlapping transmission radii, but another user equipment is positioned in the overlapping transmission radii according to an embodiment of the present invention.
Figure 5:
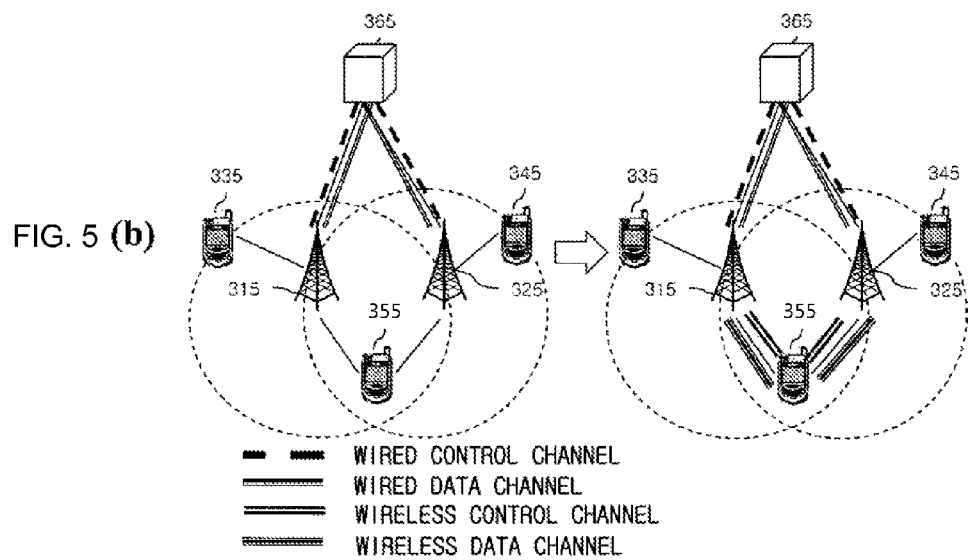

FIG. 5a illustrates an example where transmission radii of femto base stations to which two communicating user equipments are connected overlap each other and the femto base stations are positioned in the overlapping transmission radii according to an embodiment of the present invention.

Referring to FIG. 5a, the first user equipment 330 and the second user equipment 340 are respectively connected to the first femto base station 310 and the second femto base station 320 so that the user equipments 330 and 340 may communicate with each other, and the femto base stations 310 and 320 are connected to each other through the femto network controller (FNC) 350. Further, the first femto base station 310 and the second femto base station 320 are close enough for both the femto base stations 310 and 320 to be positioned in the dual region.

As in the existing scheme, for the first user equipment 330 and the second user equipment 340 to communicate with each other, in the case that voice data transmitted to the femto base stations 310 and 320, respectively, is transmitted to the counterpart user equipment through the femto network controller (FNC) 350, the voice data is transmitted via a wired IP network (Internet), and thus, quality of service (QoS) is difficult to guarantee when voice data sensitive to the latency period is transmitted or received.

Accordingly, a direct wireless data channel is generated between the first femto base station 310 and the second femto base station 320, and the first user equipment 330 performs communication with the second user equipment 340.

Likewise, in the case that the femto base stations connected to each other through the wireless data channel are open access femto base stations or femto base stations having the same CSG, a direct wireless data channel is generated right away, and in the case that, as shown in FIG. 5a, the femto base stations connected to each other through the wireless data channel are femto base stations having different CSGs, information indicating that the user equipments respectively connected to adjacent femto base stations perform communication is transferred to the femto network controller or directly to the adjacent femto base station so that a data channel may be generated. To be connected to each other through the direct wireless data channel despite the fact that both the femto base stations have different CSGs CSG1 and CSG2, the femto base station 310 or 320 may receive information on the other adjacent femto base station from the user equipment 330 or 340 so that the femto network controller (FNC) may generate the direct wireless data channel or the femto base station may actively generate the direct wireless data channel with the adjacent femto base station having a different CSG using the information received from the user equipment.

FIG. 5b illustrates an example where transmission radii of femto base stations respectively connected to two user equipments which are in communication overlap each other and the femto base stations are not positioned in the overlapping transmission radii, but another user equipment is positioned in the overlapping transmission radii according to an embodiment of the present invention.

Referring to FIG. 5b, the first user equipment 335 and the second user equipment 345 are respectively connected to the first femto base station 315 and the second femto base station 325 so as to perform communication between each other, and the femto base stations 315 and 325 are connected to each other via a femto network controller (FNC) 350. However, unlike in FIG. 3A, the first femto base station 310 and the second femto base station second femto base station 320 are not close enough for the femto base stations 315 and 325 to generate a direct wireless data channel. Under this example, in the case that the third user equipment 355 performing another communication is positioned in the dual region between the first femto base station 315 and the second femto base station 325, an indirect wireless data channel may be generated through the third user equipment 355 so that communication may be performed between the femto base stations without going through the femto network controller (FNC) 365.

Further, the third user equipment is simultaneously connected with the first femto base station 315 and the second femto base station 325, and thus, an indirect wireless control channel is generated for cooperation between the first femto base station 315 and the second femto base station 325 so as to remove interference that occurs to the third user equipment due to such simultaneous connection.

In the case that the femto base stations in communication have different CSGs, as shown in FIG. 5a, information indicating that user equipments respectively connected to adjacent femto base stations perform communication is transferred to the femto network controller or directly to the adjacent femto base station so that a data channel may be generated. Further, for an indirect wireless data/control channel to be generated between the femto base stations through the third user equipment 355, the femto base station 315 or 325 may receive information on the other adjacent femto base station from the user equipment 335, 345, or 355 so that the femto network controller (FNC) may generate the indirect wireless data/control channel or the femto base station may actively generate the indirect wireless data/control channel with the adjacent femto base station having a different CSG by using the information received from the user equipment.

Figure 6:
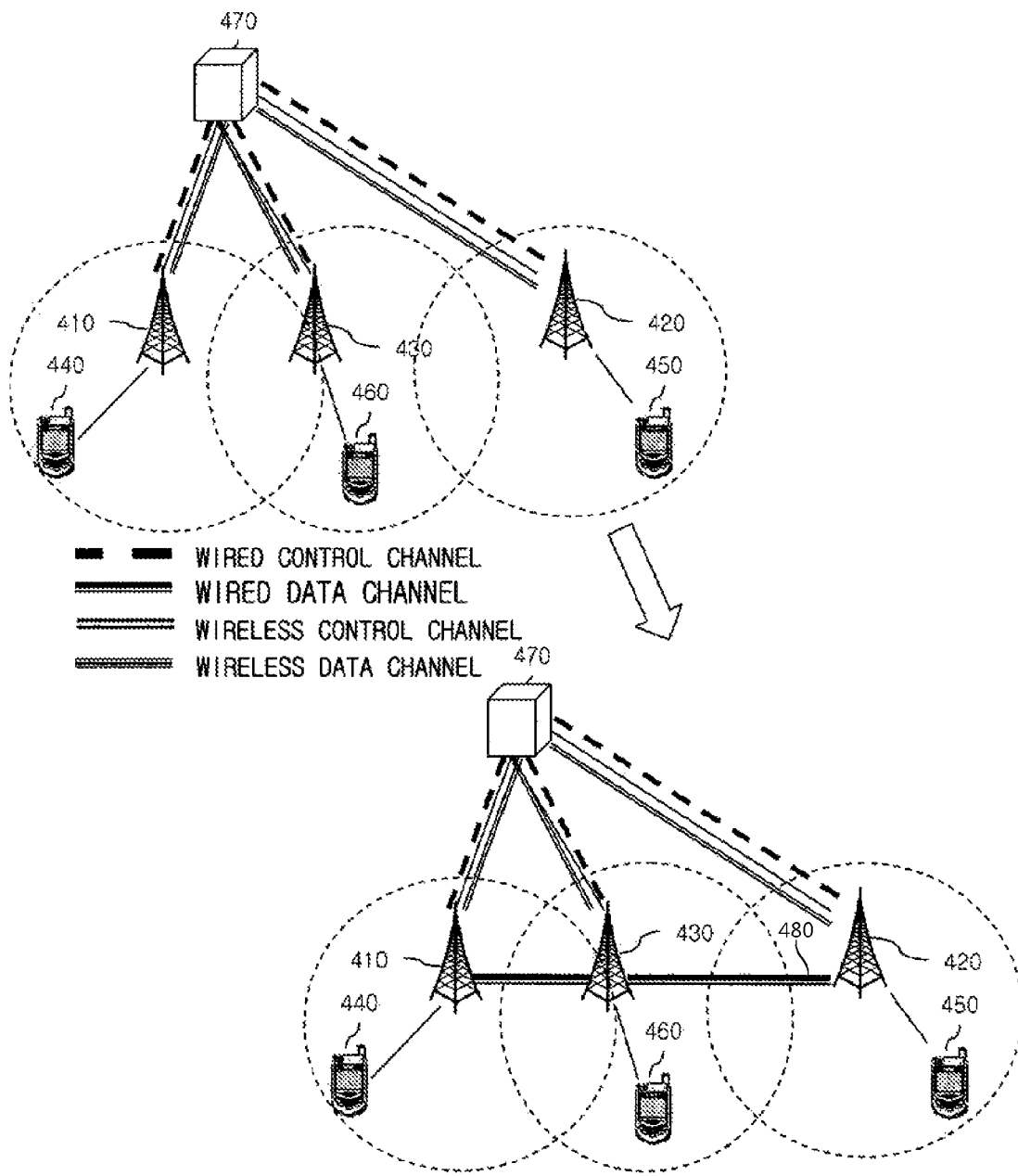
FIG. 6 illustrates an example where femto base stations connected to two user equipments in communication are adjacent to each other and positioned in a transmission radius of another femto base station according to an embodiment of the present invention.

FIG. 6 illustrates an example where femto base stations connected to two user equipments in communication are adjacent to each other and positioned in a transmission radius of another femto base station according to an embodiment of the present invention.

Referring to FIG. 6, the first user equipment 440 and the second user equipment 450 are respectively connected to the first femto base station 410 and the second femto base station 420 so as to perform communication between each other, and the first femto base station 410 and the second femto base station 420 are connected to a femto network controller (FNC) 470 through wired data/control channels. The first femto base station 410 and the second femto base station 420 are positioned in the transmission radius of an adjacent third femto base station 430, and the third femto base station 430 is connected to a third user equipment 460 to perform separate communication. The third femto base station 430 is also connected to the femto network controller (FNC) 470 through wired data/control channels.

Further, the first femto base station 410 corresponds to CGG1, and the second femto base station 420 and the third femto base station 430 correspond to CSG 2.

In such case, a method of performing communication between the first user equipment 440 and the second user equipment 450 may generate an indirect wireless data channel 480 between the first femto base station 410 and the second femto base station 420 through the third femto base station 430 so as to remove unstable quality of service (QoS) that may occur when voice data is transmitted/received through a wired IP network (Internet).

However, since the control channel is already generated through the femto network controller (FNC) 470, and there is no difference in terms of communication efficiency between generating a wireless control channel between femto base stations and using an existing wired control channel, the conventional wired control channel is used as the wireless control channel or as necessary a direct control channel between the femto base stations is generated and used.

At this time, the third femto base station 430 should be a femto base station that may cooperate with the first femto base station 410 and the second femto base station 420 respectively connected with the user equipments 440 and 450, and in the case that, as shown in FIG. 4, femto base stations having different CSGs are present, for the femto base stations to cooperate with each other despite the fact that the femto base stations have different CSGs CSG1 and CSG2, information indicating that the user equipments respectively connected of the femto base stations 410 and 420 perform communication is transferred to the femto network controller or directly to the adjacent femto base station so that a data channel may be generated. Further, the femto base station may receive information on another adjacent femto base station from the user equipment 440, 450, or 460 so that the femto network controller (FNC) may generate an indirect wireless data channel 480 or the femto base station may actively generate the indirect wireless data channel 480 with a femto base station having a different CSG by using the information received from the user equipment. That is, the third femto base station 430 should have the same CSG CSG1 and CSG2 as the femto base stations 410 and 420 respectively connected to the user equipments 440 and 450 in communication with each other or should be open access femto base stations or femto base stations that may cooperate with each other under the control of the femto network controller (FNC) 470.

Such communication method may apply to not only when only one femto base station is present between femto base stations respectively connected to user equipments but also when the femto base stations respectively connected to the user equipments are away from each other, with a plurality of femto base stations present therebetween, so that an indirect wireless control channel is generated through the plurality of femto base stations. That is, in the case that the wireless data channel between femto base stations generated through the plurality femto base stations provides more secure quality of service (QoS) than a wired data channel through the femto network controller (FNC), a wireless data channel may be generated through the plurality of femto base stations positioned between the femto base stations that are respectively communicating with the user equipments.

FIG. 7 illustrates an example where femto base stations respectively connected to two user equipments communicating with each other are not adjacent to each other but are connected to the same femto network controller (FNC) according to an embodiment of the present invention.

Referring to FIG. 7, the first user equipment 530 and the second user equipment 540 are respectively connected to the first femto base station 510 and the second femto base station 520 so as to perform communication between each other. The first femto base station 510 and the second femto base station 520 are not adjacent to each other but are connected to each other through the same femto network controller (FNC) 550.

Under this example, data transmission and reception are in principle performed through the femto network controller (FNC) 550, but in the case that two specific femto base stations 510 and 520 continue to transmit and receive data therebetween and the two femto base stations 510 and 520 are aware of what femto base station data is to be transmitted to, data transmission and reception are conducted not through the femto network controller (FNC) 550 but directly through an IP address of the counterpart femto base station that continues to be communicating.

Accordingly, in the case that the first user equipment 530 connected to the first femto base station 510 communicates with the second user equipment 540 connected to the second femto base station 520, the femto network controller (FNC) 550 notifies the femto base station 510 or 520 of the IP address of the counterpart femto base station 520 or 510 so that data is directly transmitted and received through the IP connection 560 between the first femto base station 510 and the second femto base station 520 without going through the femto network controller (FNC) 550.

However, even in such case, the already crated wired control channel which connects the femto base stations 510 and 520 with the femto network controller (FNC) 550 is maintained so that data relating to errors that may occur as a result of communication through the IP connection 560 between the femto base stations may be transferred to the femto network controller (FNC) 550 and may be processed by the femto network controller (FNC) 550.

In the example as illustrated in FIG. 7, since a plurality of different femto base stations may be present between the first femto base station 510 and the second femto base station 520, a method of generating a wireless data channel through the plurality of different femto base stations by the same method as illustrated in FIG. 6 may be considered. In such case, comparison may be made to each case with respect to quality of service (QoS) so that it is determined which method is to be used to perform communication between the user equipments.

That is, in the case of generating a data channel that connects the first femto base station 510 with the second femto base station 520 through a predetermined number or more of femto base stations due to a limitation to output of the femto base station and because noise is prone to be mixed with transmission data when too many femto base stations are provided which function as relays for generating a wireless data channel, the method suggested in connection with FIG. 6 is not adopted.

Figure 8:
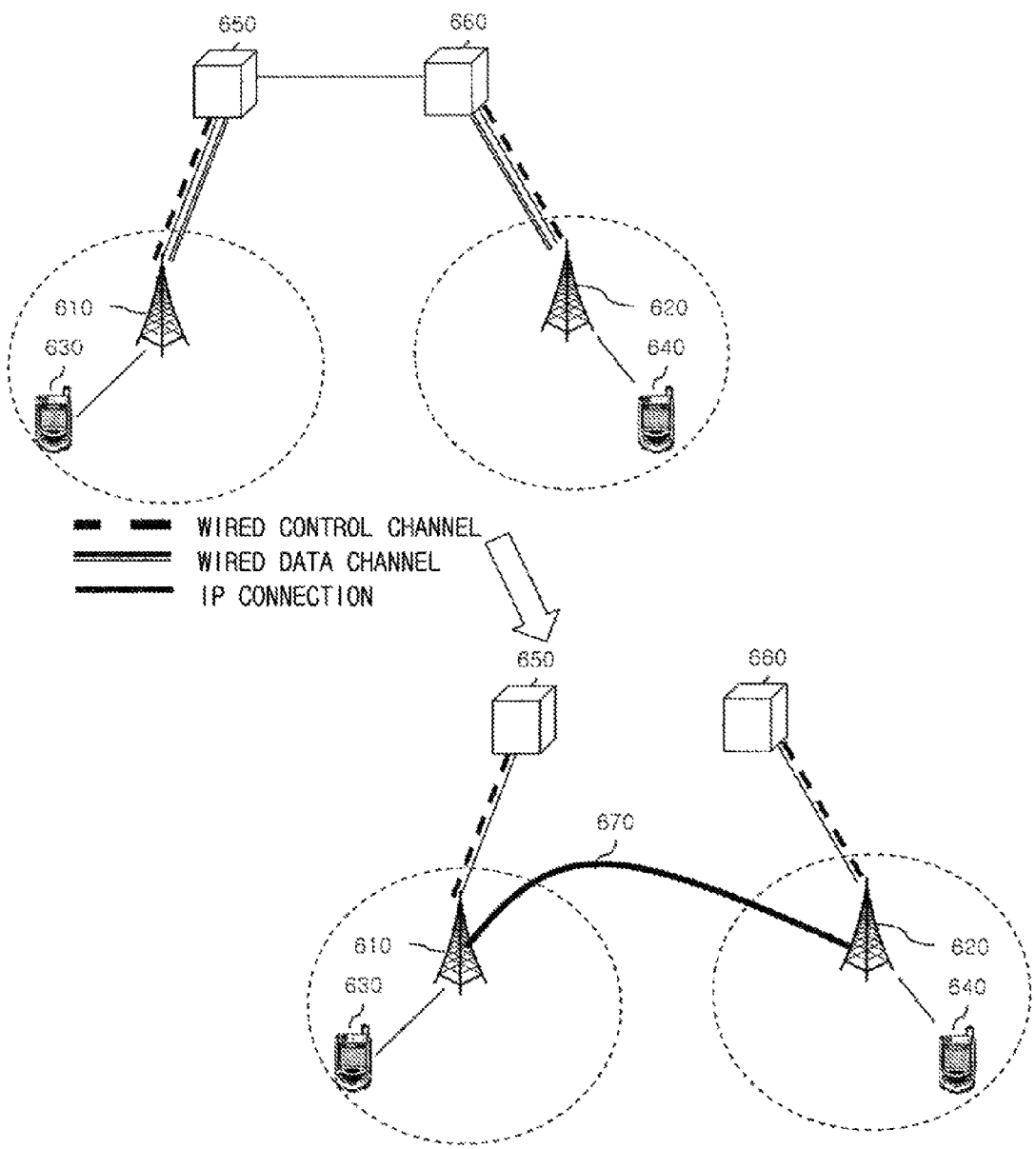
FIG. 8 illustrates an example where femto base stations respectively connected to two user equipments in communication are not adjacent to each other and are respectively connected to different femto network controllers (FNCs) according to an embodiment of the present invention.

FIG. 8 illustrates an example where femto base stations respectively connected to two user equipments in communication are not adjacent to each other and are respectively connected to different femto network controllers (FNCs) according to an embodiment of the present invention.

Referring to FIG. 8, the first user equipment 630 and the second user equipment 640 are respectively connected to the first femto base station 610 and the second femto base station 620 so as to perform communication between each other. The first femto base station 510 and the second femto base station 520 are not adjacent to each other and are respectively connected to the first femto network controller (FNC) 650 and the second femto network controller (FNC) 660.

In principle, as a process of performing communication, data transmitted from the first user equipment 630 is transmitted to the first femto network controller (FNC) 650 and the second femto network controller (FNC) 660 via the first femto base station 610 and transmitted to the second user equipment 640 via the second femto base station 620. However, in the case that two specific femto base stations 610 and 620 continue to transmit and receive data between each other, data transmission and reception are conducted not through the femto network controllers (FNCs) 650 and 660 but directly through the IP address of the counterpart femto base station that continues to be communicating.

Accordingly, in the case that the first user equipment 630 connected to the first femto base station 610 communicates with the second user equipment 640 connected to the second femto base station 620, the femto network controller (FNC) 650 or 660 notify the counterpart femto network controller (FNC) of the IP address of the femto base station 610 or 620 that is communicating with the counterpart femto base station 620 or 610 so that an adaptive IP connection is generated between the first femto base station 510 and the second femto base station.

However, even in this case, the already generated wired control channel that connects the femto base stations 610 and 620 with the femto network controllers 650 and 660 is maintained so that data relating to errors that may occur as a result of communication through IP connection between the femto base stations may be transferred to the femto network controllers (FNCs) 650 and 660 and may be processed by the femto network controllers (FNCs) 650 and 660.

Hereinafter, detailed process for specifically implementing the above-described cooperation between the femto base stations is described.

Figure 9:
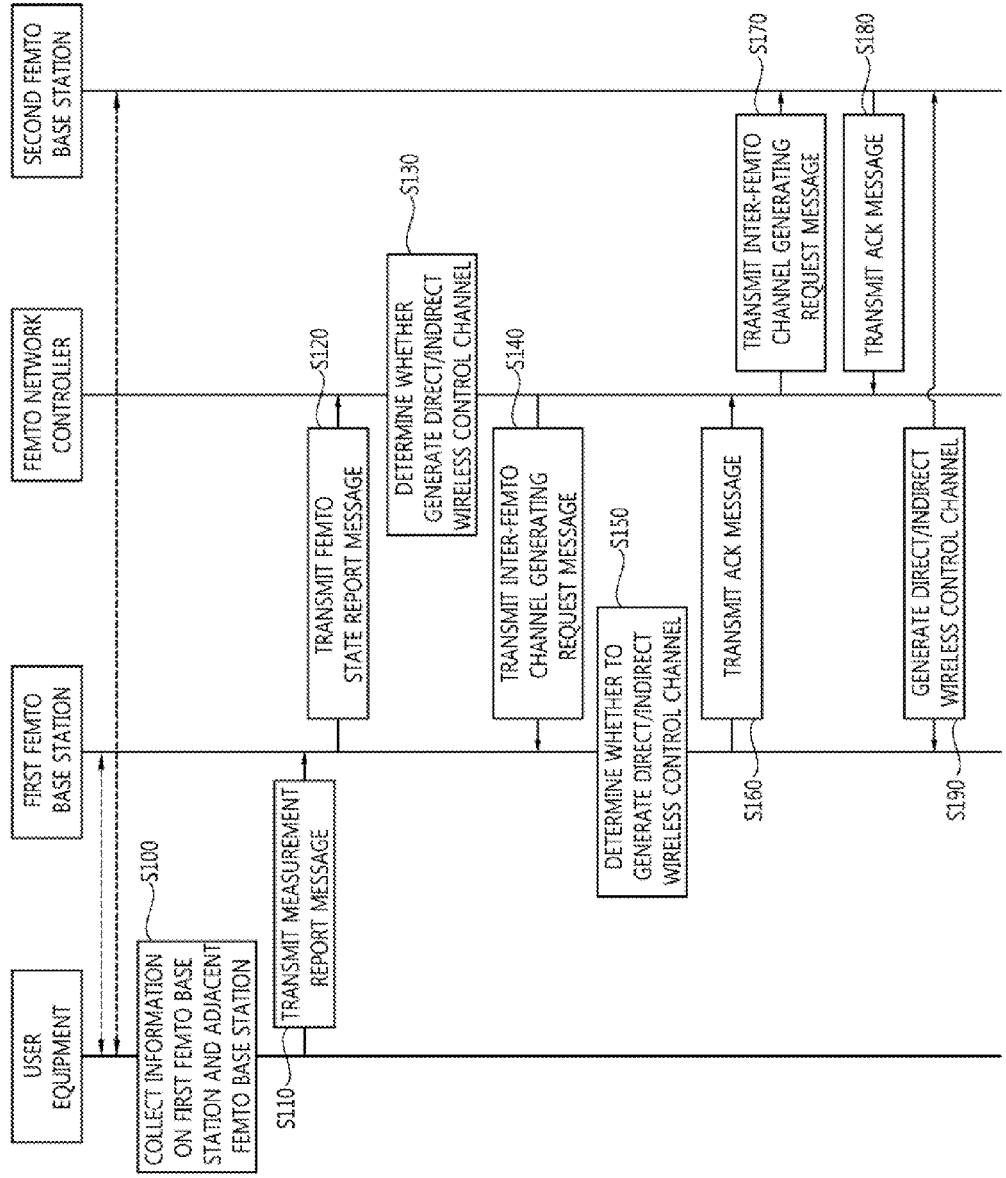
FIG. 9 illustrates a process of removing interference by generating direct/indirect wireless control channels between adjacent femto base stations through a femto network controller according to an embodiment of the present invention.

FIG. 9 illustrates a process of removing interference by generating direct/indirect wireless control channels between adjacent femto base stations through a femto network controller according to an embodiment of the present invention.

The process shown in FIG. 9 may apply to, among the cases exemplified in Table 1, the example where the femto base stations in communication directly generate a wireless control channel.

Referring to FIG. 9, a user equipment connected to a first femto base station collects information on another adjacent femto base station (for example, second femto base station) to which the user equipment is connected or may be connected (S100).

Collecting the information may be conducted periodically or whenever a new femto base station is additively connected. The information collected by the user equipment may include a femto base station ID (FSB ID), a user equipment ID (UE ID), an ID of the adjacent base station to which the user equipment is connected or may be connected (neighbor base station ID), an ID of another user equipment positioned in the dual region, and a RSSI (Received Signal Strength Indication) of the adjacent femto base station to which the user equipment is connected or may be connected.

The user equipment transmits the collected information to the first femto base station through a measurement report message (S110). The first femto base station may cooperate with the second femto base station having a different CSG through the measurement report message.

Receiving the information, the first femto base station transmits a femto state report message to the femto network controller (FNC) (S120).

The femto state report message may include the femto base station ID, the user equipment ID, the adjacent femto base station ID (second femto base station ID), the ID(s) of (an) other user equipment(s) positioned in the dual region, and the adjacent femto base station (second femto base station) RSSI, which are collected from the user equipment, and may selectively include, as obtained by putting together all of the above information, information indicating which one of a direct wireless control channel and an indirect wireless control channel profits more when the first femto base station, together with the second femto base station, generate the wireless channel.

The femto network controller (FNC) determines whether to generate a wireless control channel between the first and second femto base stations based on the femto state report message (S130).

The femto network controller (FNC) transmits information necessary for generating the wireless control channel between the femto base stations to the first and second femto base stations through an inter-femto channel generating request message (S140).

The inter-femto channel generating request message may include the first femto base station ID, the second femto base station ID, whether to generate a connection directly or via the user equipment, an ID(s) of user equipment(s) when an indirect wireless control channel is generated through the user equipment(s), and ID(s) of (an)other user equipment(s) positioned in the dual region, and may selectively include a radio resource that should be used for generating a channel between the corresponding femto base stations.

Receiving the inter-femto channel generating request message, the first femto base station and the second femto base station determine whether to perform communication through the femto network controller (FNC), which is an existing scheme, or to generate a new direct/indirect wireless control channel (S150) and transmits an agree/deny response message to the femto network controller (FNC) (S160).

When the deny response message is transmitted, the reason for the denial may be selectively sent as well.

Receiving the agree/deny response message, the femto network controller (FNC) transmits an inter-femto channel generating confirmation message to the first femto base station and the second femto base station (S170).

Receiving the inter-femto channel generating confirmation message, the first and second femto base stations transmit a response message indicating that they will start a process of generating a channel between the corresponding femto base stations to the femto network controller (FNC) (S180).

The first and second femto base stations generate a direct/indirect wireless control channel by using the inter-femto channel generating request message received from the femto network controller (FNC).

In another embodiment of the present invention, instead of the user equipment, the first femto base station may directly measure information on the adjacent femto base station and the user equipment. The first femto base station directly measures the information on the adjacent femto base station and the user equipment periodically or when a specific event occurs. The measured information may include the femto base station ID (FSB ID), the user equipment ID, the ID of the adjacent femto base station to which the user equipment is connected or may be connected, the ID of the other user equipment positioned in the dual region, and the RSSI (Received Signal Strength Indication) of the adjacent femto base station to which the user equipment is connected or may be connected.

In the case that the first femto base station directly measures the information on the adjacent femto base station and the user equipment, rather than performing steps S100 and S110, the first femto base station measures the information and transmits the measured information to the femto network controller (FNC).

Hereinafter, step S190 of FIG. 9, in which a direct/indirect wireless control channel between femto base stations is generated, is described in detail with reference to FIGS. 10A and 10B.

Figure 10:
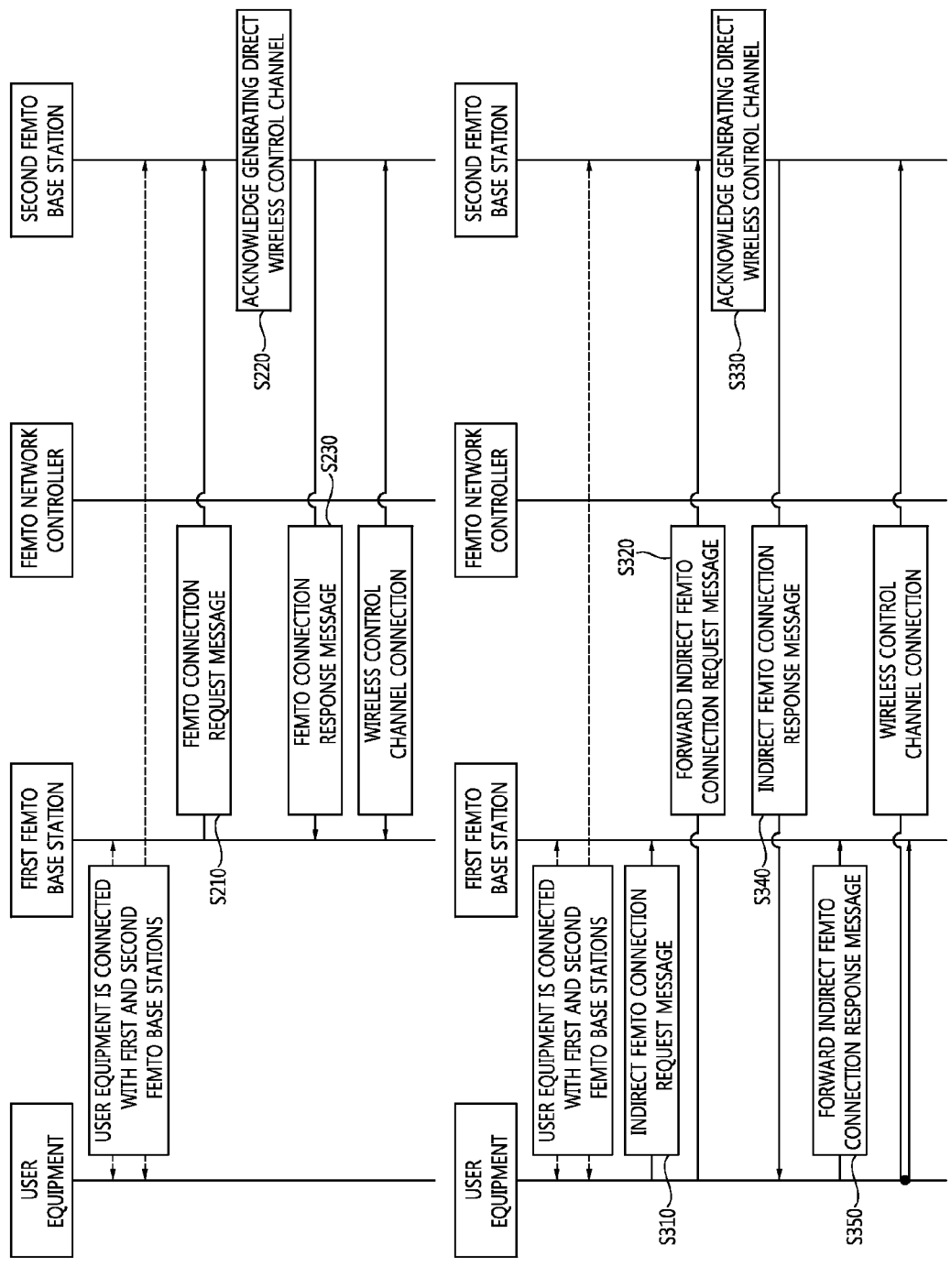
FIG. 10a illustrates a process of generating a direct wireless control channel between femto base stations.
FIG. 10b illustrates a process of generating an indirect wireless control channel between femto base stations.

FIG. 10a illustrates a process of generating a direct wireless control channel between femto base stations.

Referring to FIG. 10a, to generate a direct control channel between the femto base stations, the first femto base station transmits a femto connection request message to the second femto base station (S210). The femto connection request message may include information on whether the connection type is a direct wireless control channel or a direct wireless data channel.

Receiving the femto connection request message, the second femto base station generates a direct wireless control channel together with the first femto base station according to the request (S220) and sends a femto connection response message to the first femto base station (S230).

In the above process, it does not matter which femto base station first performs the connection request. The second femto base station may send the femto connection request message to the first femto base station, and the first femto base station may send the femto connection response message. Or, the first and second femto base stations may send the femto connection request message at the same time.

FIG. 10b illustrates a process of generating an indirect wireless control channel between femto base stations.

Referring to FIG. 10b, to generate indirect control/data channels, the first and second femto base stations transmit an indirect femto connection request message to the user equipment positioned in the dual region (S310). The indirect femto connection request message may include the first femto base station ID and the second femto base station ID.

The user equipment forwards the indirect femto connection request message received from the first femto base station to the second femto base station (S320).

According to the request, the second femto base station approves generating a direct wireless control channel together with the first femto base station (S330) and sends a femto connection response message to the user equipment (S340).

The user equipment forwards the received femto connection response message to the first femto base station (S350).

In the above process, it does not matter which femto base station first performs the connection request. The second femto base station may transmit the femto connection request message to the first femto base station through the user equipment positioned in the dual region, and the first femto base station may send the femto connection response message. Or, the first and second femto base stations may send the femto connection request message at the same time.

Figure 11:
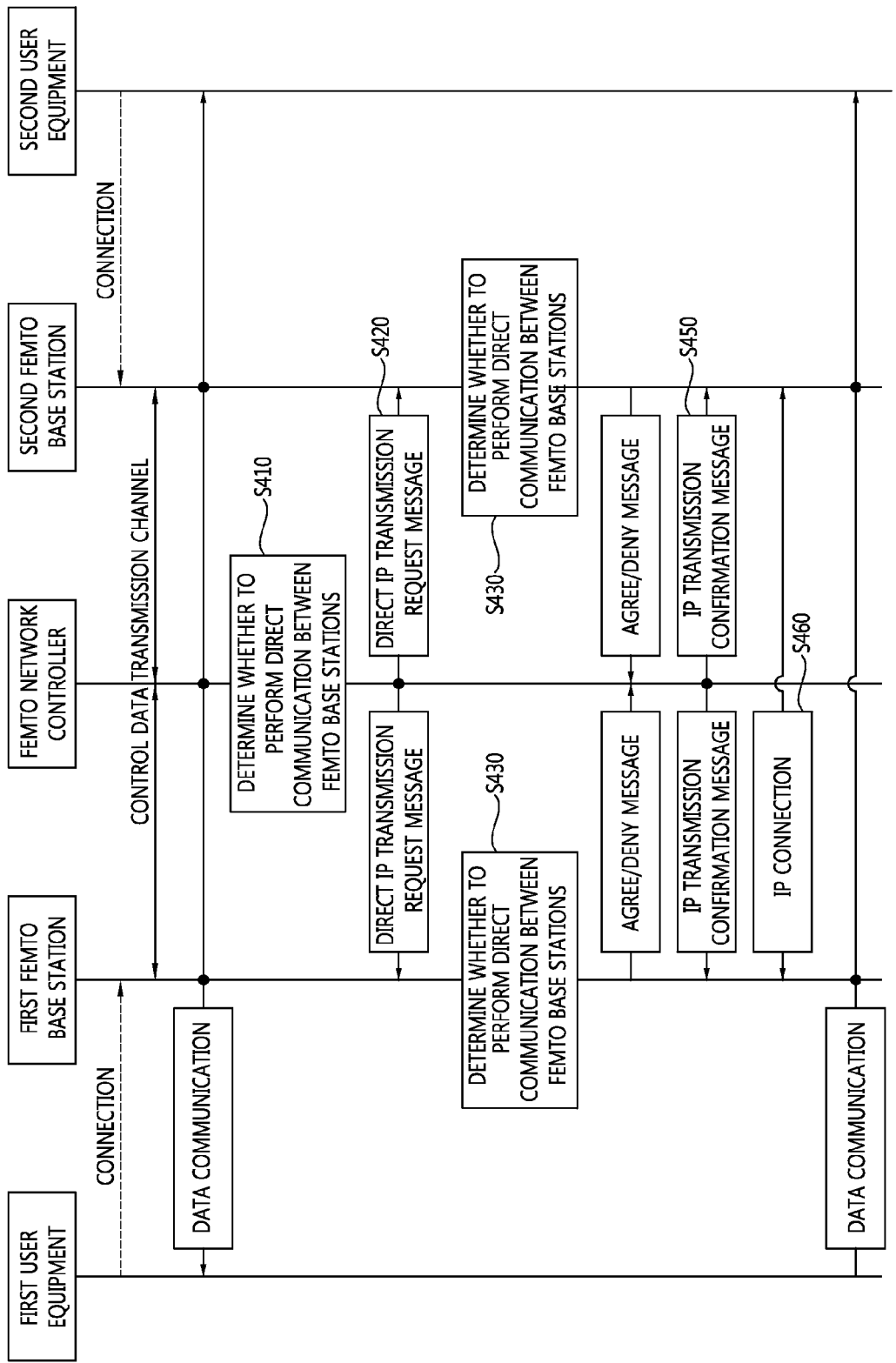
FIG. 11 illustrates a process of generating a wireless data channel through an IP connection between femto base station in the case that femto base stations respectively connected to two user equipments in communication are not adjacent to each other but are connected to the same femto network controller (FNC) according to an embodiment of the present invention.

FIG. 11 illustrates a process of generating a wireless data channel through an IP connection between femto base station in the case that femto base stations respectively connected to two user equipments in communication are not adjacent to each other but are connected to the same femto network controller (FNC) according to an embodiment of the present invention.

That is, while communicating with each other, the first and second user equipments are respectively connected to the first and second femto base stations, and both the femto base stations are connected to the femto network controller (FNC).

Under such example, continuous data transmission and reception are conducted between the first user equipment connected to the first femto base station and the second user equipment connected to the second femto base station, and it is determined whether it is advantageous in view of communication efficiency to allow data to be transmitted between the femto base stations directly without passing through the femto network controller (FNC) (S410).

In such determination, the first and second femto base stations perform communication through the femto network controller (FNC), the femto network controller (FNC) may thereby determine whether to perform direct communication between the femto base stations by collecting information on the first and second user equipments and the first and second femto base stations.

In the case that the direct communication between the femto base stations is determined to be more advantageous, the femto network controller (FNC) transmits a direct IP transmission request message to the first and second femto base stations (S420).

The direct IP transmission request message may include the ID and IP address of the first femto base station, the ID and IP address of the second femto base station, the first user equipment ID, and the second user equipment ID.

Receiving the direct IP transmission request message, the first and second femto base stations determine whether it is possible to perform the direct communication between the femto base stations (S430) and sends an agree/deny message to the femto network controller (FNC). Selectively, in the case of sending the deny message, the reason for the denial may be sent as well.

If receiving the agreement message from both the femto base stations, the femto network controller (FNC) transmits a direct IP transmission confirmation message to the first and second femto base stations (S450).

Receiving the direct IP transmission confirmation message, the first and second femto base stations generate an IP connection so that direct communication is performed between the femto base stations (S460).

Figure 12:
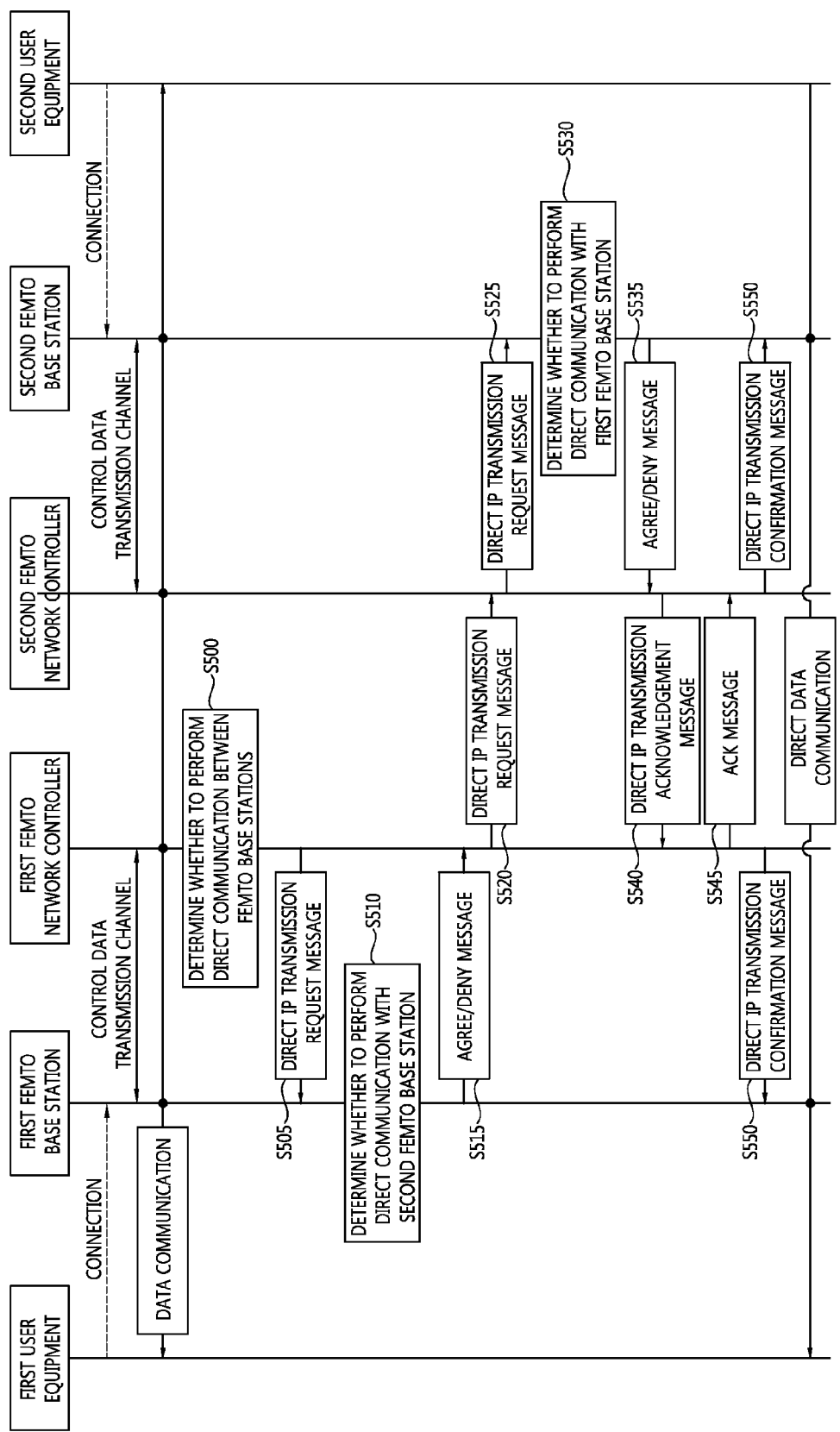
FIG. 12 illustrates a process of generating a wireless data channel through an IP connection between femto base stations in the case that femto base stations respectively connected with two user equipments in communication are not adjacent to each other but are respectively connected to different femto network controllers (FNCs) according to an embodiment of the present invention.

FIG. 12 illustrates a process of generating a wireless data channel through an IP connection between femto base stations in the case that femto base stations respectively connected with two user equipments in communication are not adjacent to each other but are respectively connected to different femto network controllers (FNCs) according to an embodiment of the present invention.

That is, while communicating with each other, the first and second user equipments are respectively connected to the first and second femto base stations, and both the femto base stations are respectively connected to the first and second femto network controllers (FNCs).

Under such example, the first femto network controller (FNC) determines whether continuous data transmission and reception are conducted between the first user equipment connected to the first femto base station and the second user equipment connected to the second femto base station and it is advantageous in terms of communication efficiency to allow data to be transmitted between the femto base stations directly without passing through the femto network controller (FNC) (S500).

In the case that direct communication between the femto base stations is determined to be advantageous, the first femto network controller (FNC) transmits a direct IP transmission request message to the first femto base station (S505). At this time, in the case that the second femto network controller (FNC) also performs step S500, the second femto network controller (FNC) may selectively send a request to the first femto network controller (FNC) so that the first femto network controller (FNC) triggers the direct communication between the femto base stations on its own, thereby inducing step S505.

The direct IP transmission request message may include the ID and IP address of the first femto base station, the ID and IP address of the second femto base station, the first user equipment ID, and the second user equipment ID.

Receiving the direct IP transmission request message, the first femto base station determines whether to be able to perform direct communication between femto base stations (S510) and sends an agree/deny message to the first femto network controller (FNC) (S515). Selectively, in the case of sending the deny message, the reason for the denial may be sent as well.

Receiving the agreement message from the first femto base station, the first femto network controller (FNC) transmits a direct IP transmission request message to the second femto network controller (FNC) (S520).

Receiving the direct IP transmission request message, the second femto network controller (FNC) transmits the direct IP transmission request message to the second femto base station (S525).

The second femto base station determines whether to perform direct communication with the first femto base station according to the received direct IP transmission request message (S530) and sends an agree/deny message to the second femto network controller (FNC) (S535). Likewise, in the case of sending the deny message, the reason for the denial may be sent as well.

Receiving the agree/deny message, the second femto network controller (FNC) transfers a direct IP transmission acknowledgement message to the first femto network controller (FNC) (S540).

Receiving the direct IP transmission acknowledgement message, the first femto network controller (FNC) sends an Ack message to the second femto network controller (FNC) so as to start direct IP transmission (S545).

The first femto network controller (FNC) and the second femto network controller (FNC) respectively send a direct IP transmission confirmation message to the first and second femto base stations (S550) so that direct communication between the femto base stations may be possible.

In the above embodiments, the femto network controller (FNC) controls generating direct/indirect wireless control/data channels between femto base stations. However, the femto base station may also generate, on its own, direct/indirect wireless control/data channels with an adjacent femto base station in communication.

Figure 13:
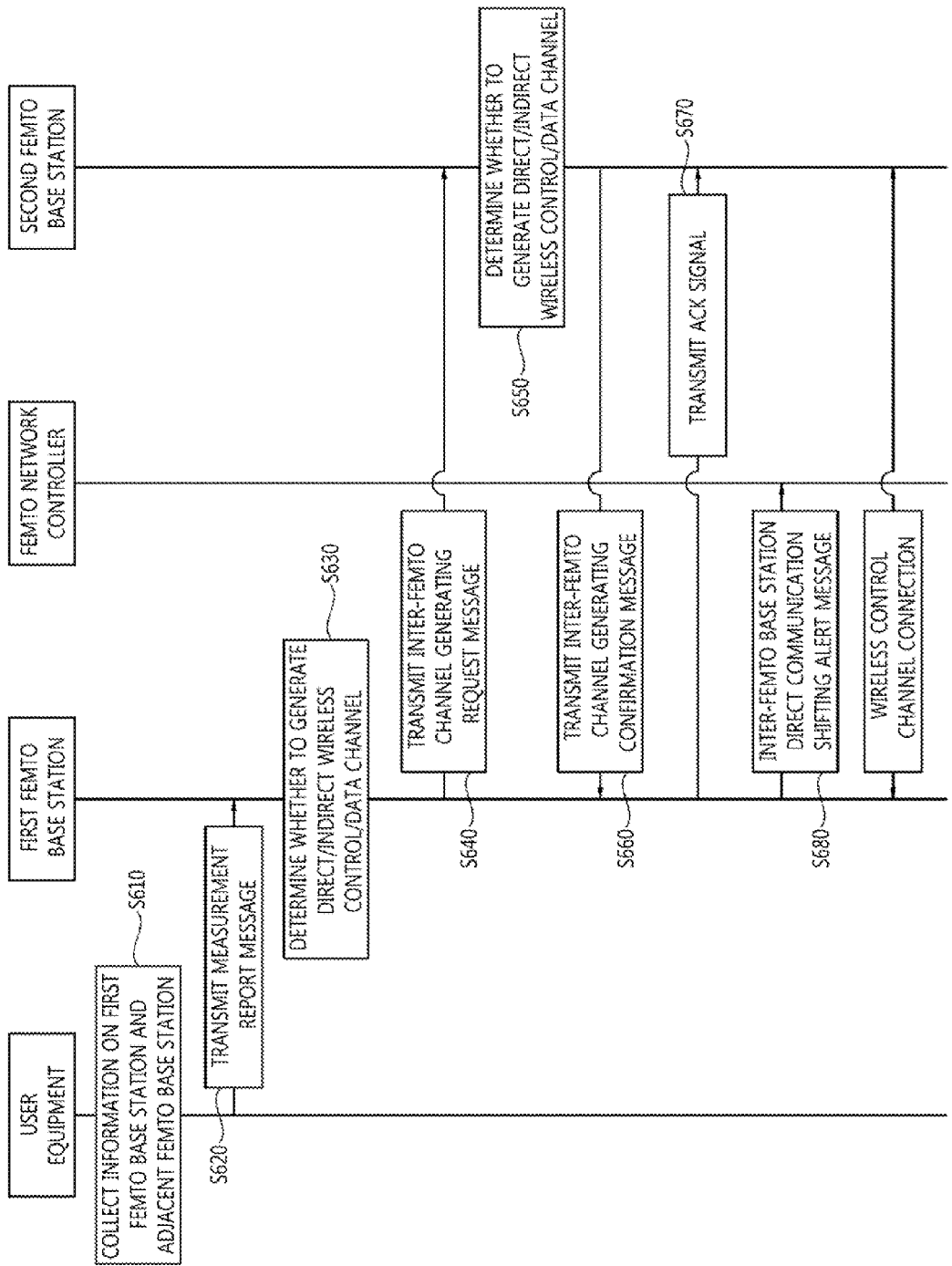
FIG. 13 illustrates a process of generating direct wireless control/data channels between adjacent femto base stations by a femto base station without involvement of a femto network controller according to an embodiment of the present invention.

FIG. 13 illustrates a process of generating direct wireless control/data channels between adjacent femto base stations by a femto base station without involvement of a femto network controller according to an embodiment of the present invention.

That is, FIG. 13 illustrates an example where in the case that a single user equipment is connected to a plurality of femto base stations, a wireless control channel may be generated to remove interference that occurs to the user equipment and in the case that user equipments are respectively connected to femto base stations connected to the same femto network controller (FNC) and perform communication, the femto base station generates a direct data channel.

The process illustrated in FIG. 13 may apply to cases 1, 3, and 5 in Table 1 above.

Referring to FIG. 13, the user equipment connected to the first femto base station collects information on another adjacent femto base station (which may be, for example, the second femto base station) to which the user equipment is connected or may be connected (S610).

Collecting the information may be performed periodically or when a newly connected femto base station is added. The information collected by the user equipment may include a femto base station ID (FSB ID), a user equipment ID, an ID of an adjacent femto base station to which the user equipment is connected or may be connected, an ID of another user equipment positioned in the dual region, and an RSSI (Received Signal Strength Indication) of the adjacent femto base station to which the user equipment is connected or may be connected.

The user equipment transmits the collected information to the first femto base station to which the user equipment is connected through a measurement report message (S620).

The measurement report message may include the femto base station ID, the user equipment ID, the ID of the adjacent femto base station (second femto base station ID), the ID(s) of (an)other user equipment(s) positioned in the dual region, and the RSSI of the adjacent femto base station (second femto base station), which have been collected by the user equipment, and may selectively include, as obtained by putting together all of the above information, information indicating which one of direct wireless control/data channel and indirect wireless control/data channel profits more when the first femto base station, together with the second femto base station, generate the wireless channel.

The first femto base station determines whether to generate wireless control/data channels between the first and second femto base stations based on the measurement report message (S630).

The first femto base station transmits information necessary for generating the wireless control/data channels between the femto base stations and an inter-femto channel generating request message to the second femto base station (S640).

The inter-femto channel generating request message may include the first femto base station ID, the second femto base station ID, whether the channel to be generated between the femto base stations is a wireless control channel or a wireless data channel, whether to make a connection directly or via a user equipment, in the case that user equipment(s) are used to generate the indirect wireless control/data channels, ID(s) of the user equipment(s), and ID(s) of user equipment(s) positioned in the dual region.

Receiving the inter-femto channel generating request message, the second femto base station determines whether to perform communication through the femto network controller (FNC), which is an existing scheme, or to generate new direct wireless control/data channels and determines whether to generate direct wireless control/data channels together with the first femto base station (S650). When it is determined that direct communication is performed between the femto base stations, the second femto base station transmits an inter-femto channel generating confirmation message to the first femto base station (S660).

Receiving the inter-femto channel generating confirmation message, the first femto base station transmits an Ack signal to the second femto base station (S670) and may selectively may send an inter-femto base station direct communication shifting alert message alerting the femto network controller (FNC) of performing direct communication between the femto base stations (S680).

Receiving the inter-femto base station direct communication shifting alert message, the femto network controller (FNC) releases the channel connection, and the first and second femto base stations generate direct wireless control/data channels between the femto base stations (S690).

According to another embodiment of the present invention, besides the above method, instead of the user equipment, the first femto base station may directly measure information on the adjacent femto base station and the user equipment to thereby determine whether to generate the direct/indirect wireless control/data channels.

Figure 14:
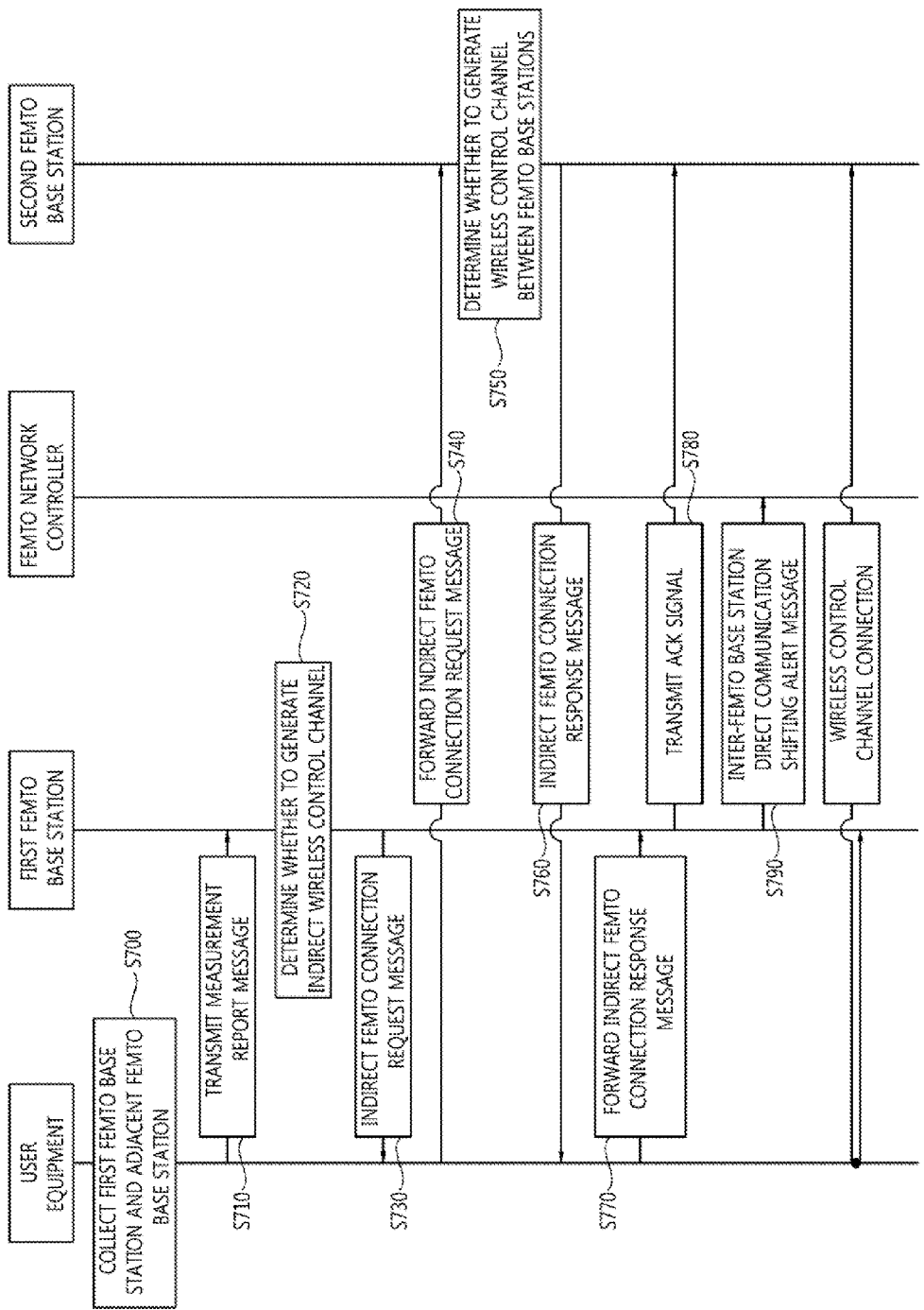
FIG. 14 illustrates a process of generating indirect wireless control/data channels between adjacent femto base stations by a femto base station without involvement of a femto network controller according to an embodiment of the present invention.

FIG. 14 illustrates a process of generating indirect wireless control/data channels between adjacent femto base stations by a femto base station without involvement of a femto network controller according to an embodiment of the present invention.

That is, FIG. 14 illustrates an example where in the case that a single user equipment is connected to a plurality of femto base stations, an indirect wireless control channel is generated to remove interference that occurs to the user equipment.

The process illustrated in FIG. 14 may apply to cases 2 and 4 in Table 1 above.

Referring to FIG. 14, the user equipment connected to the first femto base station collects information on another adjacent femto base station (which may be, for example, the second femto base station) to which the user equipment is connected or may be connected (S700).

Collecting the information may be performed periodically or when a newly connected femto base station is added. The information collected by the user equipment may include a femto base station ID (FSB ID), a user equipment ID, an ID of an adjacent femto base station to which the user equipment is connected or may be connected, an ID of another user equipment positioned in the dual region, and an RSSI (Received Signal Strength Indication) of the adjacent femto base station to which the user equipment is connected or may be connected, and may selectively include radio resource information that should be used for generating a channel between the femto base stations.

The user equipment transmits the collected information to the first femto base station to which the user equipment is connected through a measurement report message (S710).

The first femto base station determines whether to generate a wireless control channel between the first and second femto base stations based on the measurement report message (S720).

If it is determined to generate the wireless control channel between the first and second femto base stations, information necessary for generating the wireless control channel is transmitted to the user equipment through an inter-femto channel generating request message (S730).

The inter-femto channel generating request message may include the first femto base station ID, the second femto base station ID, whether to make a connection directly or via a user equipment, in the case of generating the indirect wireless control channel via user equipment(s), ID(s) of the user equipment(s), and ID(s) of (an)other user equipment(s) positioned in the dual region, and may selectively include radio resource information that should be used for generating a channel between the femto base stations.

Receiving the inter-femto channel generating request message, the user equipment forwards the inter-femto channel generating request message to the second femto base station (S740).

Receiving the inter-femto channel generating request message, the second femto base station determines whether to perform communication through the femto network controller (FNC), which is an existing scheme, or generates new indirect wireless control/data channels (S750), and sends an agree/deny response message to the user equipment (S760).

In the case of sending the deny message, the reason for the denial may be selectively sent as well.

Receiving the agree/deny response message, the user equipment forwards the agree/deny response message to the first femto base station (S770).

Receiving the agree/deny response message, the first femto base station transmits an inter-femto channel generating confirmation message to the second femto base station through the user equipment (S780) and may selectively send the femto network controller (FNC) an inter-femto base station direct communication shifting alert message to alert the femto network controller (FNC) of performing direct communication between the femto base stations (S790).

Receiving the inter-femto base station direct communication shifting alert message, the femto network controller (FNC) releases the channel connection, and the first and second femto base stations generate an indirect wireless control channel between the femto base stations via the user equipment.

According to another embodiment of the present invention, besides the above-described method, instead of the user equipment, the first femto base station may directly measure information on the adjacent femto base station and the user equipment.

Although the embodiments of the present invention have been described, the scope of the invention is not limited to the embodiments, and various changes, modifications, or variations to the present invention may be made without departing from the scope of the invention and the appended claims.

The invention claimed is:

1. A communication method of a first femto base station, the method comprising:
   transmitting a femto state report message by the first femto base station, the femto state report message generated based on a measurement report message to a femto network controller, the first femto base station connected to a user equipment and the measurement report message transmitted by the user equipment;
   receiving an inter-femto channel generating request message by the first femto base station, the inter-femto channel generating request message generated based on the measurement report message from the femto network controller;
   determining, via the first femto base station, whether to generate a direct wireless control channel or an indirect wireless control channel based on the inter-femto channel generating request message; and
   generating, via the femto base station, the direct wireless control channel or indirect wireless data channel between the first femto base station and a second femto base station;

wherein the measurement report message includes an identifier (ID) of the second femto base station and a received signal strength indication (RSSI) of the second femto base station;

wherein the femto state report message includes information on a recommended wireless control channel; and wherein the recommended wireless control channel is the direct wireless control channel or the indirect wireless data channel.

2. The method of claim 1, wherein the measurement report message further includes:
- an ID of the first femto base station,
- an ID of the user equipment,
- an ID of another user equipment located on a dual region corresponding to an overlapped region between a first communication region of the first femto base station and a second communication region of the second femto base station, and
- IDs of one or more closed subscriber groups (CSGs) to which the another user equipment is capable of being connected.

3. The method of claim 1, wherein:
- a closed subscriber group (CSG) of the first femto base station is different from a CSG of the second femto base station;
- the indirect wireless control channel is configured based on the user equipment;
- the user equipment is located on a dual region corresponding to an overlapped region between a first communication region of the first femto base station and a second communication region of the second femto base station; and
- the user equipment is capable of communicating with each of the first femto base station and the second femto base station.

4. The method of claim 1, wherein generating the direct wireless control channel or indirect wireless control channel comprises:
- transmitting, via the first femto base station, a femto connection request message to the second femto base station to generate the direct wireless control channel, the femto connection request message including information to request generation of the direct wireless control channel;
- receiving a femto connection response message from the second femto base station by the first femto base station; and
- generating the direct wireless control channel by the first femto base station based on the femto connection response message.

5. The method of claim 1, wherein generating the direct wireless control channel or indirect wireless control channel comprising:
- transmitting, via the first femto base station, a femto connection request message to the user equipment to generate the indirect wireless control channel between the first femto base station and the second femto base station;
- receiving a femto connection response message from the user equipment by the first femto base station; and
- generating the indirect wireless control channel by the first femto base station to communicate with the second femto base station based on the femto connection response message.

6. A communication method of a femto base station, the method comprising:
- determining, via a femto network controller, whether a direct communication is performed between a first femto base station and a second femto base station, the femto network controller connected to the first femto base station and the second femto base station;
- transmitting a direct internet protocol (IP) transmission request message to the first femto base station and the second femto base station by the femto network controller; and
- transmitting an IP transmission confirmation message by the femto network controller to the first femto base station and the second femto base station when the femto network controller receives an agreement message from the first femto base station and the second femto base station;
- wherein each of the first femto base station and the second femto base station receiving the IP transmission confirmation message performs the direct communication based on an IP based connection;
- wherein the femto network controller determines whether the direct communication performs or not based on information transmitted by the first femto base station, the second femto base station, a first user equipment connected to the first femto base station, and a second user equipment connected to the second femto base station; and
- wherein the direct IP transmission request message includes an identifier (ID) and an IP address of the first femto base station, an ID and an IP address of the second femto base station, an ID of the first user equipment, and an ID of the second user equipment.

* * * * *